(12) United States Patent
Zeng

(10) Patent No.: US 12,401,878 B2
(45) Date of Patent: Aug. 26, 2025

(54) EXTERNAL FLASH, AND COLOR CORRECTION SYSTEM HAVING EXTERNAL FLASH

(71) Applicant: YINGYOU EQUIPMENT CO., LTD., Guangdong (CN)

(72) Inventor: Weiling Zeng, Guangdong (CN)

(73) Assignee: YINGYOU EQUIPMENT CO., LTD., Guangdong (CN)

( * ) Notice: Subject to any disclaimer, the term of this patent is extended or adjusted under 35 U.S.C. 154(b) by 182 days.

(21) Appl. No.: 18/250,730

(22) PCT Filed: Jun. 22, 2021

(86) PCT No.: PCT/CN2021/101591
§ 371 (c)(1),
(2) Date: Apr. 26, 2023

(87) PCT Pub. No.: WO2022/156143
PCT Pub. Date: Jul. 28, 2022

(65) Prior Publication Data
US 2023/0403456 A1    Dec. 14, 2023

(30) Foreign Application Priority Data

Jan. 22, 2021   (CN) .......................... 202110100286.0
Jan. 22, 2021   (CN) .......................... 202120186202.5

(51) Int. Cl.
*H04N 23/56*     (2023.01)
*H05B 47/105*    (2020.01)
*H05B 47/19*     (2020.01)

(52) U.S. Cl.
CPC ........... *H04N 23/56* (2023.01); *H05B 47/105* (2020.01); *H05B 47/19* (2020.01)

(58) Field of Classification Search
None
See application file for complete search history.

(56) References Cited

U.S. PATENT DOCUMENTS 9,071,744 B1    6/2015   Rahman et al.
10,154,256 B1   12/2018  Segapelli et al.
(Continued)

FOREIGN PATENT DOCUMENTS

| CN | 1446444 | 10/2003 |
|---|---|---|
| CN | 1912770 | 2/2007 |

(Continued)

OTHER PUBLICATIONS

WIPO, International Search Report for PCT/CN2021/101591, Oct. 14, 2021.
(Continued)

*Primary Examiner* — Rodney E Fuller
(74) *Attorney, Agent, or Firm* — Hodgson Russ LLP

(57) ABSTRACT

An external flash comprising a light source assembly, a driving circuit, a first communication circuit and a color correction processing circuit, wherein the light source assembly comprises one or more LED light sources; the driving circuit is used for driving the light source assembly to emit light; the first communication circuit is used for communicating with a terminal device, so as to receive a color correction control instruction sent by the terminal device; the color correction processing circuit is connected to the driving circuit and is electrically connected to the first communication circuit; the color correction processing circuit receives the color correction control instruction transmitted by the first communication circuit, and performs color correction processing on light-emission information of the light source assembly to generate color correction result information; and the driving circuit drives, according to the color correction result information, the light source assembly to emit light.

18 Claims, 3 Drawing Sheets

(56) References Cited

U.S. PATENT DOCUMENTS

| | | | |
|---|---|---|---|
| 2004/0021430 A1* | 2/2004 | Linzmaier | H05K 13/081 315/312 |
| 2005/0281549 A1 | 12/2005 | Shih et al. | |
| 2012/0154627 A1 | 6/2012 | Rivard et al. | |
| 2015/0334258 A1 | 11/2015 | O'Neill | |
| 2017/0202075 A1* | 7/2017 | Zhou | H04N 23/10 |

FOREIGN PATENT DOCUMENTS

| | | |
|---|---|---|
| CN | 103220422 | 7/2013 |
| CN | 103369767 | 10/2013 |
| CN | 103402291 | 11/2013 |
| CN | 204272440 | 4/2015 |
| CN | 106060415 | 10/2016 |
| CN | 112731735 | 4/2021 |
| CN | 214704262 | 11/2021 |
| DE | 19842367 | 7/2004 |
| JP | 2006121163 | 5/2006 |
| JP | 2006121163 A * | 5/2006 |
| JP | 2006322986 | 11/2006 |
| KR | 20060067791 | 6/2006 |
| WO | 2016161486 | 10/2016 |
| WO | 2018231342 | 12/2018 |
| WO | 2022156143 | 7/2022 |

OTHER PUBLICATIONS

CNIPA, First Office Action for CN Application No. 202110100286.0, Dec. 31, 2024.

EPO, Extended European Search Report for EP Application No. 21920524.2, Jun. 24, 2024.

CNIPA, Second Office Action for CN Application No. 202110100286.0, Jun. 25, 2025.

* cited by examiner

EXTERNAL FLASH, AND COLOR CORRECTION SYSTEM HAVING EXTERNAL FLASH

CROSS-REFERENCE TO RELATED APPLICATIONS

This application is a U.S. national stage entry of International Application No. PCT/CN2021/101591, filed Jun. 22, 2021, which claims priority to Chinese Patent Application Nos. 202110100286.0 and 202120186202.5, each filed Jan. 22, 2021, the entire disclosures of which are incorporated herein by reference.

FIELD OF TECHNOLOGY

The present application relates to the technical field of photographing-specific flash, and more particularly, to an external flash and a color correction system having the external flash.

BACKGROUND

With the development of mobile communication technology, mobile terminals have played an increasingly important role in people's life and work. Especially some mobile terminal devices with photographing functions, such as mobile phone, MP4, PDA, and notebook computer, can bring great fun to people's lives. Photographing requires light sources, and artificial light is often needed to assist in photographing besides natural light. An artificial light source of the mobile terminal with photographing functions often cannot meet the actual use requirements. Therefore, people often use an external flash to assist in photographing.

However, after long-term use of LED lamp beads in the external flash, there will be deviations in chroma and light-emission intensity, resulting in the fact that actual light-emission illuminance, chroma, and other light-emission parameters cannot reach preset light-emission parameters so that the expected light filling effect cannot be realized.

The above information disclosed in the Background is only for the enhancement of understanding of the background of the present disclosure and therefore it may include information that does not constitute prior art known to a person of ordinary skill in the art.

SUMMARY

There are provided an external flash and a color correction system having the external flash according to embodiments of the present disclosure. The technical solution is as below:

According to one aspect of the present application, an external flash is provided in the present application, including:
a light source assembly;
a driving circuit configured to drive the light source assembly to emit light;
a first communication circuit configured to communicate with a terminal device, so as to receive a color correction control instruction sent by the terminal device;
a color correction processing circuit connected to the driving circuit and electrically connected to the first communication circuit, wherein the color correction processing circuit receives the color correction control instruction transmitted by the first communication circuit, and performs color correction processing on light-emission information of the light source assembly to generate color correction result information; and the driving circuit drives, according to the color correction result information, the light source assembly to emit light.

According to another aspect of the present application, a color correction system having the external flash is further proposed in the present application, including the above external flash, a color correction detection device and a terminal device, where the external flash is in communication connection with the terminal device, and the color correction detection device is in communication connection with the terminal device; and the color correction detection device is configured to detect light-emission information of the external flash, a color correction processing circuit of the external flash processes the light-emission information under the control of the terminal device to generate color correction result information; and a driving circuit of the external flash drives a light source assembly of the external flash to emit light according to the color correction result information.

It should be understood that the above general description and the following detailed description are exemplary and explanatory only and are not intended to limit the present application.

BRIEF DESCRIPTION OF THE DRAWINGS

The above and other objects, features, and advantages of the present application will become more apparent by describing in detail exemplary embodiments thereof with reference to the accompanying drawings.

DETAILED DESCRIPTION OF THE EMBODIMENTS

Figure 1:
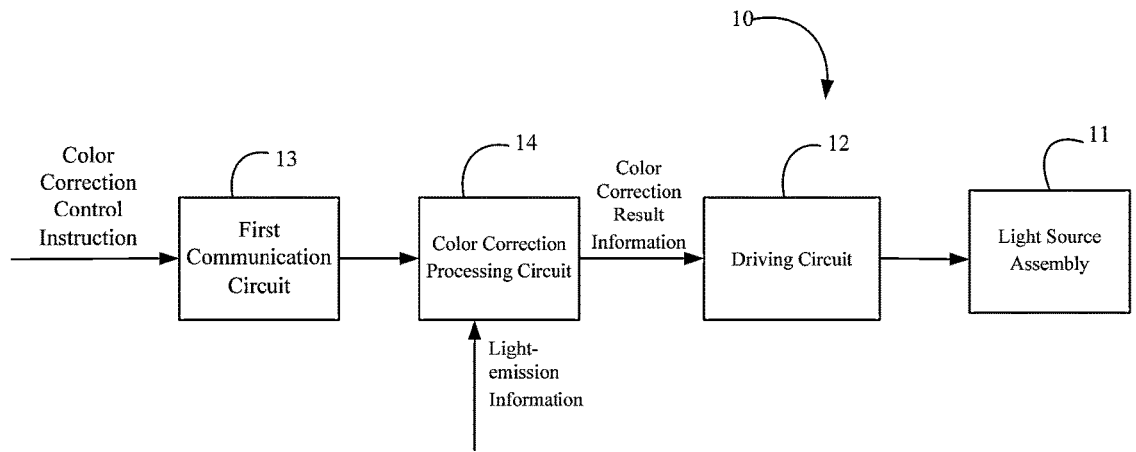
FIG. 1 shows a circuit structure block diagram of an external flash according to an example embodiment.

Although the present application can readily be embodied in different forms of embodiment, however, only some of the specific embodiments are shown in the drawings and will be described in detail in the description, while it is understood that the description is to be regarded as an exemplary illustration of the principles of the present application and is not intended to limit the present application to those described herein.

Thus, one feature pointed out in the description is intended to illustrate one of the features of one embodiment of the present application and is not intended to imply that each embodiment of the present application must have the illustrated feature. In addition, it should be noted that many features are described in the description. Although certain features may be combined to illustrate a possible system design, these features may also be used for other unspecified combinations. Therefore, unless otherwise stated, the illustrated combinations are not intended to be limiting.

In the embodiments illustrated in the drawings, indications of direction (such as up, down, left, right, front, and back) are used to explain that the structure and movement of the various elements of the present application are not absolute but relative. These descriptions are appropriate when these elements are in the positions shown in the drawings. If the description of the positions of the element changes, the indications of the directions change accordingly.

The exemplary embodiments will now be described more fully with reference to the accompanying drawings. However, the example embodiments can be implemented in a variety of forms and should not be construed as being limited to the examples set forth herein. Rather, these embodiments are provided so that the present application will be more comprehensive and complete, and the concept of example embodiments will be fully communicated to those skilled in the art. The accompanying drawings are only schematic illustrations of the present application and are not necessarily drawn to scale. Like reference numerals in the figures denote identical or similar parts and thus repetitive descriptions thereof will be omitted.

The preferred embodiment of the present application is further elaborated below in conjunction with the accompanying drawings of the description.

In the present application, an external flash is first proposed, and the external flash is used for performing color correction on its color. Color correction may refer to matching the actual light-emission parameters of the external flash with the set light-emission parameters, and color correction may also refer to adjusting the consistency of light-emission parameters of each LED lamp bead in the external flash. Light-emission parameters may include luminance, color temperature, and saturation, etc.

Referring to FIG. 1, in an embodiment, an external flash 10 includes a light source assembly 11, a driving circuit 12, a first communication circuit 13, and a color correction processing circuit 14. The light source assembly 11 includes one or more LED light sources. The driving circuit 12 is used for driving the light source assembly 11 to emit light. The first communication circuit 13 is used for communicating with a terminal device 30, so as to receive a color correction control instruction sent by the terminal device 30. The color correction processing circuit 14 is connected to the driving circuit 12 and electrically connected to the first communication circuit 13. The color correction processing circuit 14 receives the color correction control instruction transmitted by the first communication circuit 13, and performs color correction processing on light-emission information of the light source assembly 11 to generate color correction result information; and the driving circuit 12 drives, according to the color correction result information, the light source assembly 11 to emit light.

In this embodiment, the color correction control instruction is sent by the terminal device 30. The terminal device 30 may be a smart terminal, such as mobile phone, tablet, or notebook computer; and the terminal device 30 may also be a smart wearable device, such as smart head-mounted device, smart bracelet, or smart belt.

In an embodiment, the terminal device 30 includes a display circuit, and the display circuit is used for displaying a GUI (Graphical User Interface) screen for inputting the color correction control instruction. Specifically, a color correction application software is installed in the terminal device 30, and when the color correction application software is running, a color correction control interface may be displayed on a display screen. The color correction control interface includes multiple controls for a user to send a color correction start instruction, set a color correction parameter, select a color correction mode, etc. (hereinafter referred to as color correction control instructions). The color correction control interface may further include a displaying window to display color correction progress. This embodiment improves the human-computer interaction ability, and makes it convenient for the user to correct different parameters of the external flash 10 according to their own needs, and correct these parameters to target parameters that meet their requirements.

An intelligent terminal, after receiving the color correction control instruction sent by the user, transmits the instruction to the color correction processing circuit 14 through the first communication circuit 13, so that the color correction processing circuit 14 performs color correction processing on the light-emission information of the external flash 10 according to the color correction control instruction, thus generating the corresponding color correction result information.

Here, the light-emission information of the above-mentioned light source assembly 11 is collected by the color correction detection device 20. Here, the light-emission information includes one or more pieces of information of luminance, chroma, saturation, etc. Here, the external flash 10 may be taken as a whole to collect its parameters such as luminance, chroma, and saturation. In another embodiment, in the case that a flash includes multiple LED light sources, the light-emission information is one or more parameters of luminance, chroma, saturation, and the like of each LED light source. That is, in this embodiment, each LED light source is used as a minimum circuit to perform light-emission correction on each LED in a targeted manner, so as to improve the accuracy of light-emission correction. During the detection, each LED light source may be enabled to emit light independently, thus the light-emission information of the LED light source is obtained.

The color correction detection device 20 may include a color pick-up circuit, a data conversion circuit, a filter circuit, etc. According to a target to be corrected, the color pick-up circuit may include various types of light sensors, such as illuminance sensor, chroma sensor, and color temperature sensor. The color correction detection device 20 includes a collection window, and the collection window is exposed on the surface of the color correction detection device. The collection window is provided facing a light-emission surface of the external flash 10, thus the color pick-up circuit can receive the light emitted by the external flash 10. Here, the light emitted by the external flash 10 may be picked up multiple times. Schematically, the external flash 10 is enabled to operate in various light-emission modes and light-emission information in each mode is sampled. Here, the light-emission modes include flashing mode, modeling light mode, constant lighting mode, etc. In each mode, the light-emitting information is picked up at least once. The data conversion circuit is used for converting the analog quantity of the collected light-emitting information into the corresponding digital quantity. The filter circuit is used for filtering an input or an output of the data conversion circuit to reduce noise interference.

The color correction processing circuit 14 may include a data sorting circuit. The data sorting circuit is connected to an analog-to-digital conversion circuit, so as to perform data sorting on a digital quantity of the collected light-emission information. The specific data sorting method may be determined according to a color correction processing algorithm, and the digital quantity of the collected light-emission information may also be sorted one by one according to the position of the LEDs in the external flash 10. In fact, the data sorting circuit may also be provided in the terminal device 30.

In an example, the light-emission information of the light source assembly 11 may be pre-stored in the color correction processing circuit 14 after being detected by the color correction detection device 20, and the light-emission information will be invoked when the color correction processing is required.

Figure 2:
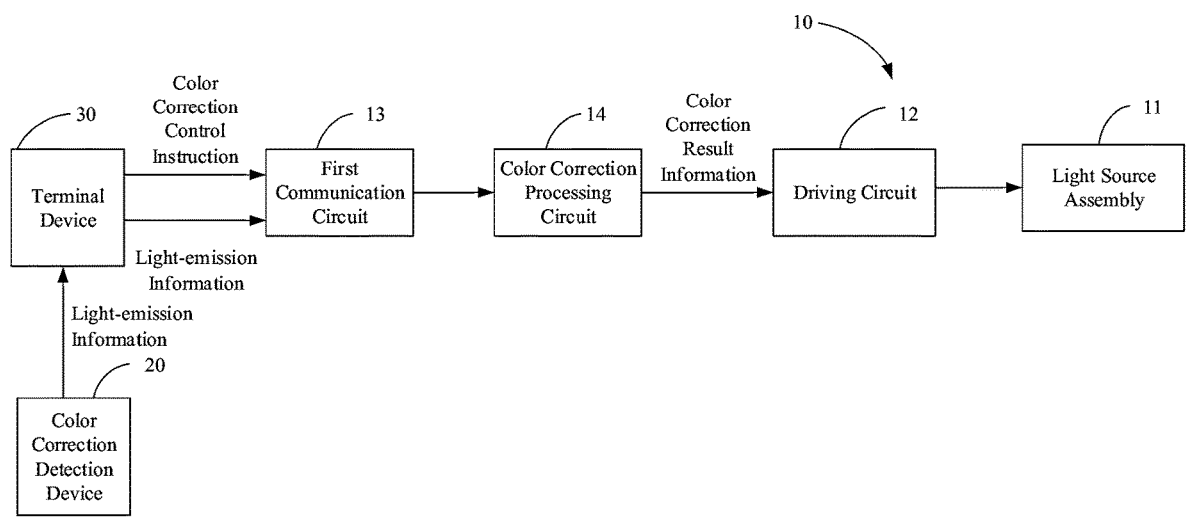
FIG. 2 shows a circuit structure block diagram of a color correction system having an external flash according to an example embodiment.

Referring to FIG. 2, in another example, since the color correction detection device 20 may be connected to the terminal device 30, when the light-emission information is detected, the color correction detection device 20 may transmit the light-emission information to the terminal device 30 and the terminal device 30 directly sends an original light-emission information to the external flash 10, the color correction detection device 20 may also send the sorting data of the light-emission information formed after the analog-to-digital conversion and data sorting to the external flash 10.

Specifically, in an embodiment, the first communication circuit 13 is further used for receiving the light-emission information sent by the terminal device 30, where the light-emission information is collected by the color correction detection device 20.

In another embodiment, the first communication circuit 13 is used for receiving the sorting data of the light-emission information sent by the terminal device 30, where the sorting data of the light-emission information is formed through the terminal device 30 performing sorting process on the light-emission information collected by the color correction detection device 20.

In this embodiment, the terminal device 30 performs a sorting process on the collected light-emission information, and since the data sorting requires fast operation speed and storage capacity, the data sorting speed may be improved by using a powerful processor and large storage capacity of the terminal device 30. More importantly, since there is no need to provide a data sorting circuit in the color correction detection device 20, the volume of the color correction detection device 20 can be reduced, which is conducive to improving the portability of the color correction detection device 20.

In the above-mentioned embodiment, the first communication circuit 13 of the external flash 10 is used for communicating with the terminal device 30. The first communication circuit 13 may be a wireless communication circuit. Here, the wireless communication circuit may be built into the color correction detection device 20 or external to the color correction detection device 20, for example, an external USB wireless transceiver. The first communication circuit 13 may be a wireless communication circuit; and the wireless communication circuit includes one or more of a WIFI module, a Bluetooth module, a Zig-Bee module, and an infrared communication module. This embodiment improves the convenience of communication between the external flash 10 and the terminal device 30. And the arrangement of the wireless communication circuit can eliminate the need for providing interfaces on the external flash 10.

In another embodiment, the first communication circuit 13 includes a communication interface, which is one of a USB interface, a TYPE C interface, an RS232 interface, and an RS485 interface. Here, there may be one or more communication interfaces.

Figure 3:
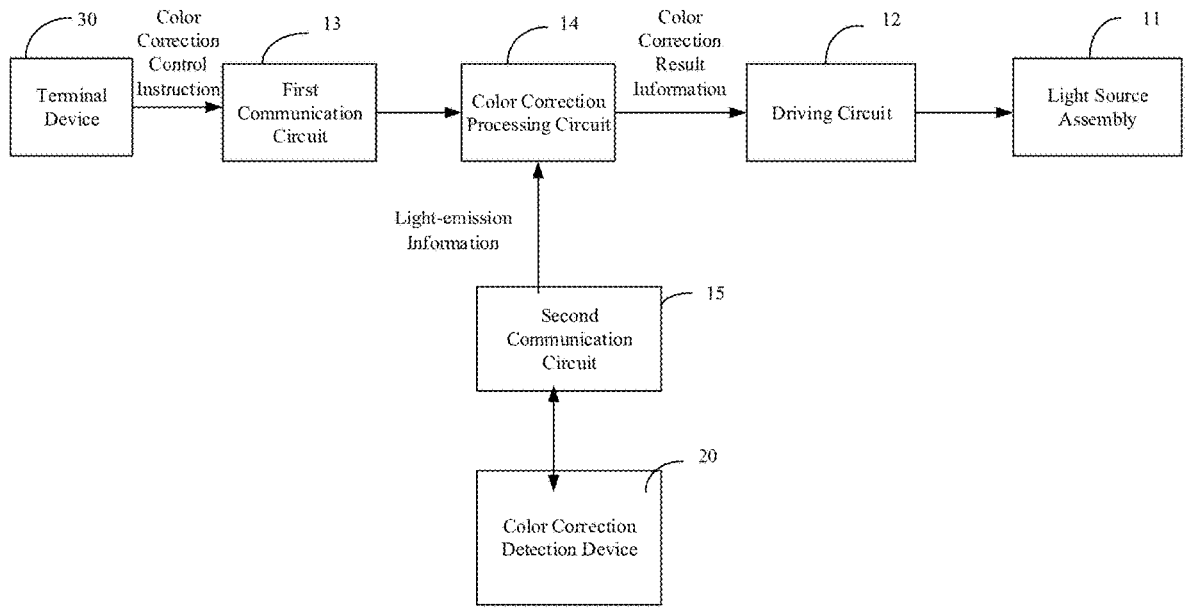
FIG. 3 shows a circuit structure block diagram of a color correction system having an external flash according to another example embodiment.

Referring to FIG. 3, specifically, in an embodiment, the external flash 10 further includes a second communication circuit 15, and the second communication circuit 15 is used for communicating with the color correction detection device 20. The color correction detection device 20 is used for detecting the light-emission information of the light source assembly 11, and the color correction processing circuit 14 receives the light-emission information through the second communication circuit 15.

In this embodiment, the second communication circuit 15 may be a wireless communication circuit; and the wireless communication circuit includes one or more of a WIFI module, a Bluetooth module, a Zig-Bee module, and an infrared communication module. This embodiment improves the convenience of communication between the external flash 10 and the color correction detection device 20.

The second communication circuit 15 may be a communication interface electrically connected to the color correction processing circuit 14, such as one of a USB interface, a TYPE C interface, an RS232 interface, and an RS485 interface.

Figure 4:
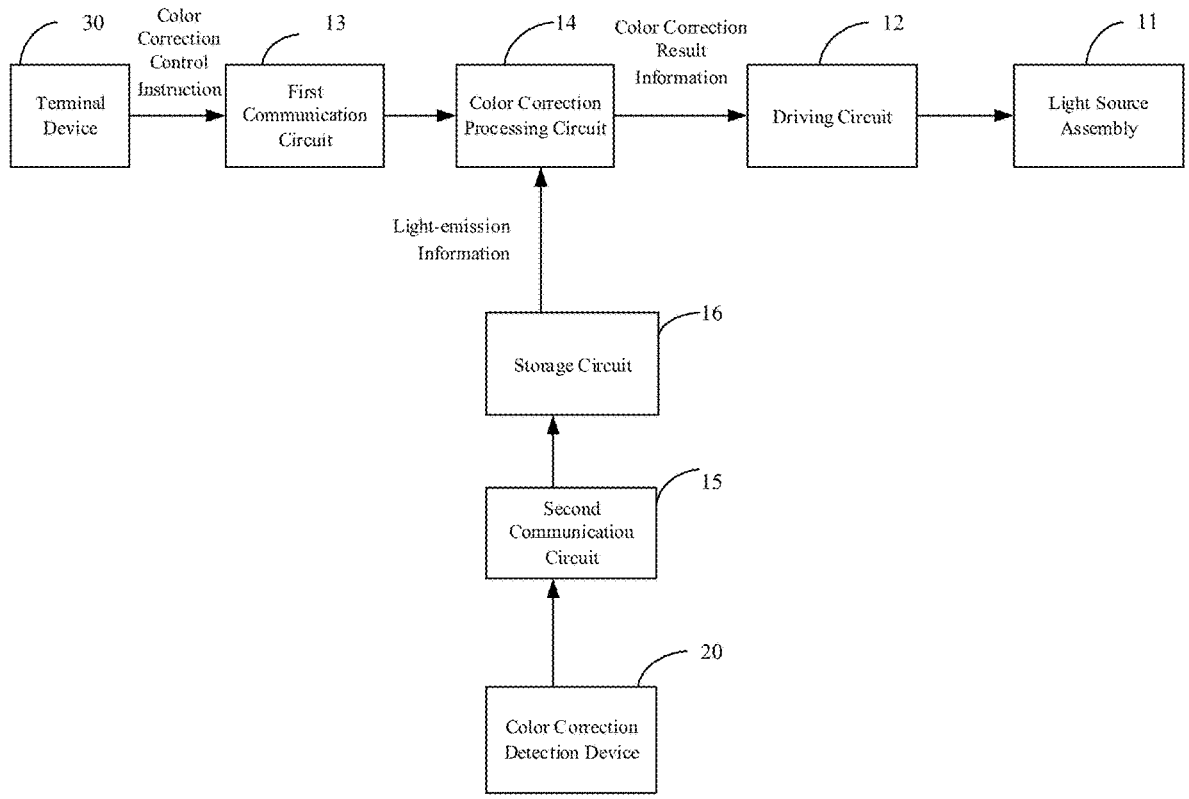
FIG. 4 shows a circuit structure block diagram of a color correction system having an external flash according to yet another example embodiment.

Referring to FIG. 4, in an embodiment, the external flash 10 further includes a storage circuit 16, and the storage circuit 16 is used for storing the light-emission information. The storage circuit 16 is electrically connected to the first communication circuit 13 or the second communication circuit 15, so as to receive the light-emission information through the first communication circuit 13 or the second communication circuit 15. The storage circuit 16 may be ROM, RAM, etc., or may be a storage medium, such as USB flash disk.

The color correction processing circuit 14 further includes a data processing circuit, and a color correction processing algorithm may be stored in the data processing circuit, and the above sorted light-emission data is logically calculated with the color correction processing algorithm, thus generating color correction result information. The color correction result information may be an adjustment program or a specific light-emission correction value.

Schematically, in an example, the data processing circuit includes a correction chip, and the correction chip includes a correction coefficient matrix. Based on the correction coefficient matrix, the above sorted sampling data is calculated and processed.

In another case, a preset parameter value is compared with the sampled sorting data of the light-emission information to correct a driving current of the external flash 10. The external flash 10 driven by the corrected driving current can enable the actual light-emission parameters of the flash to exactly match the set parameters.

In an embodiment, the driving circuit 12 further includes a timing reception terminal, and the timing reception terminal is used for being connected to the terminal device 30, so as to receive a timing control instruction sent by the terminal device 30. The color correction detection device 20 collects the light-emission information of the external flash 10 according to the timing control instruction.

The timing reception terminal and the terminal device 30 can be connected directly or indirectly, which is not limited herein. The timing control instruction is used for controlling the driving circuit 12 to drive the light source assembly 11 to emit light at a preset timing and controlling the light-emission information collection circuit to collect the light-emission information at a preset timing.

Here, the terminal device 30, according to the color correction control instruction received by itself, sends the corresponding timing control instruction to the timing reception terminal and the color correction detection device 20. The timing control instruction may include instructions such as light-emission mode execution sequence, light-emission frequency, illuminance-changing timing, color-changing timing, etc., of the external flash 10. The timing control instruction controls the color control detection circuit 20 to collect the light emitted by the external flash 10 in the preset timing, so that a collection timing is synchronized with the light-emission timing, thus being able to determine timing information corresponding to the collected light-emission information and improve the accuracy of correction. In addition, this embodiment allows the color control detection circuit 20 not to collect data when the external flash 10 does not emit light, which is conducive to reducing noise interference of the color control detection circuit 20 and improving the accuracy of data sorting; and it is also conducive to energy conservation.

Figure 5:
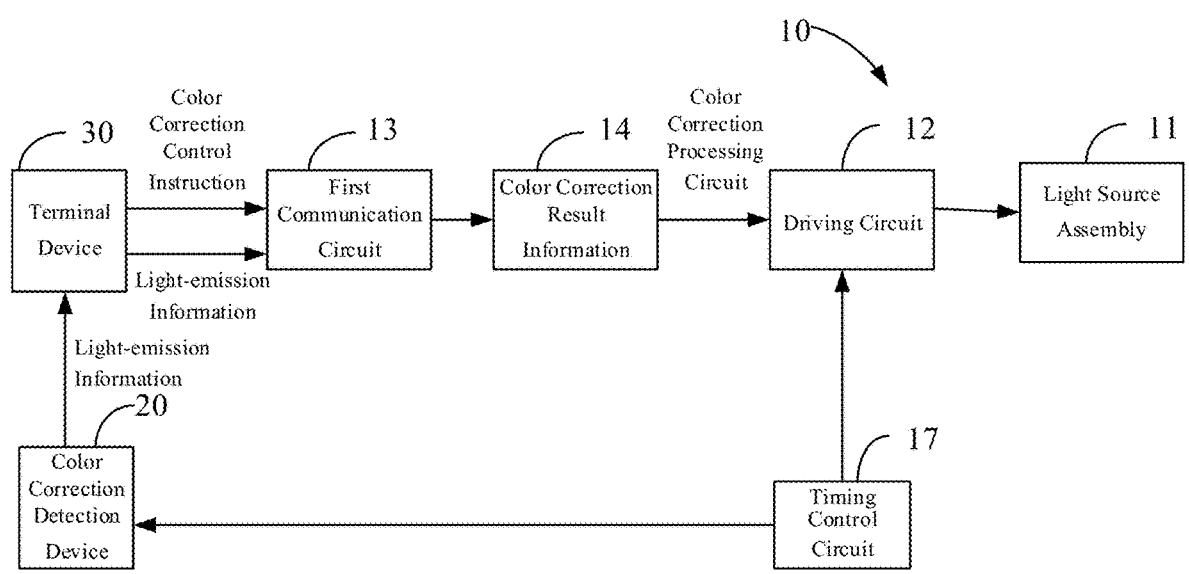
FIG. 5 shows a circuit structure block diagram of a color correction system having an external flash according to still yet another example embodiment.

Referring to FIG. 5, in another embodiment, the external flash 10 further includes a timing control circuit 17, and the timing control circuit 17 is electrically connected to the driving circuit 12. The timing control circuit 17 is electrically connected to the color control detection circuit 20. The color control detection circuit 20 is used for detecting the light-emission information of the light source assembly; and the timing control circuit 17 sends a timing signal to the driving circuit 12 and the color correction control detection device 20 according to the color correction control instruction, so as to enable the light source assembly 11 to emit light at a preset timing and enable the color correction detection device to collect the light-emission information at a preset timing correspondingly.

Here, the terminal device 30, according to the color correction control instruction received by itself, sends a timing control instruction to the timing control circuit 17, and the timing control circuit 17 sends the corresponding timing control signal to the driving circuit 12 and the color correction detection device 20. The timing control instruction may include instructions such as light-emission mode execution sequence, light-emission frequency, illuminance-changing timing, color-changing timing, etc., of the external flash 10. The timing control instruction controls the color control detection circuit 20 to collect the light emitted by the external flash 10 in the preset timing, so that a collection timing is synchronized with the light-emission timing, thus being able to determine timing information corresponding to the collected light-emission information and improve the accuracy of correction. In addition, this embodiment allows the color control detection circuit 20 not to collect data when the external flash 10 does not emit light, which is conducive to reducing noise interference of the color control detection circuit 20 and improving the accuracy of data sorting; and it is also conducive to energy conservation.

In an embodiment, the external flash 10 further includes a light-emission control circuit, and the light-emission control circuit is electrically connected to the color correction processing circuit 14. The light-emission control circuit includes a programming terminal, and the programming terminal is electrically connected to the color correction processing circuit 14, and the programming terminal receives the color correction result information, so as to adjust a light-emission control program in the light-emission control circuit. The driving circuit 12 is electrically connected to the light-emission control circuit, so as to drive the light source assembly 11 to emit light according to the adjusted light-emission control program.

It should be understood that the setting of the programming terminal indicates that there is a programming module in the color correction processing circuit 14. The programming module may be in handshake communication with the light-emission control circuit and satisfy the relevant communication protocol, so as to smoothly program the program and adjust the original light-emission control program and the driving current to the light source assembly 11, thus fundamentally correcting the deviation of the light-emission effect of the external flash 10.

The above-mentioned light-emission information and color correction result information only represent the substantial meaning of the signal. In fact, in the process of signal transmission, the form will change. For example, the conversion of the analog quantity and the digital quantity, transmission in the form of a single signal or packaging into data packets, etc., are not specifically limited herein.

Referring to FIG. 2, a color correction system having an external flash is further proposed in the solution of the present application, including an external flash 10, a color correction detection device 20, and a terminal device 30. The external flash 10 is in communication connection with the terminal device 30, and the color correction detection device 20 is in communication with the terminal device 30. The color correction detection device 20 is used for detecting light-emission information of the external flash 10, a color correction processing circuit 14 of the external flash 10 processes the light-emission information under the control of the terminal device 30 to generate color correction result information; and a driving circuit 12 of the external flash 10 drives a light source assembly 11 of the external flash 10 to emit light according to the color correction result information.

While the present application has been described with reference to several typical embodiments, it is understood that the terms which have been used are words of description and illustration, instead of limitation. Since the present application can be embodied in various forms without departing from the spirit or essence of the invention, it should therefore be understood that the foregoing embodiments are not limited to any of the foregoing details, but should be construed broadly within the spirit and scope of the appended claims, so that all variations and modifications falling within the scope of the claims or their equivalents are to be covered by the appended claims.

What is claimed is:

1. An external flash, comprising:
   a light source assembly;
   a driving circuit configured to drive the light source assembly to emit light;
   a first communication circuit configured to communicate with a terminal device, so as to receive a color correction control instruction sent by the terminal device;
   a color correction processing circuit connected to the driving circuit and electrically connected to the first communication circuit, wherein the color correction processing circuit receives the color correction control instruction transmitted by the first communication circuit, and performs color correction processing on light-emission information of the light source assembly to generate color correction result information; and the driving circuit drives, according to the color correction result information, the light source assembly to emit light; and
   a timing control circuit electrically connected to the driving circuit, wherein the timing control circuit is electrically connected to a color correction detection device, wherein the color correction detection device is configured to detect the light-emission information of the light source assembly;

wherein the timing control circuit sends a timing signal to the driving circuit and the color correction control detection device according to the color correction control instruction, so as to enable the light source assembly to emit light at a preset timing and enable the color correction detection device to collect the light-emission information at the preset timing correspondingly.

2. The external flash according to claim 1, wherein the first communication circuit is further configured to receive light-emission information sent by the terminal device, and wherein the light-emission information is collected by a color correction detection device.

3. The external flash according to claim 1, wherein the first communication circuit is configured to receive sorting data of light-emission information sent by a terminal device, and wherein the sorting data of the light-emission information is formed by the terminal device sorting and processing light-emission information that is collected by a color correction detection device.

4. The external flash according to claim 1, wherein the first communication circuit comprises a wireless communication circuit; and
wherein the wireless communication circuit comprises one or more of a WIFI module, a Bluetooth module, a Zig-Bee module, and an infrared communication module.

5. The external flash according to claim 1, wherein the external flash further comprises a second communication circuit, and the second communication circuit is configured to be connected to a color correction detection device, and wherein the color correction detection device is configured to detect the light-emission information of the light source assembly; and
wherein the color correction processing circuit receives the light-emission information through the second communication circuit.

6. The external flash according to claim 1, wherein the first communication circuit comprises a communication interface, and wherein the communication interface is one of a USB interface, a TYPE C interface, an RS232 interface, and an RS485 interface.

7. The external flash according to claim 1, wherein the external flash further comprises a storage circuit, and the storage circuit is configured to store the light-emission information.

8. The external flash according to claim 1, wherein the external flash further comprises a light-emission control circuit, and the light-emission control circuit is electrically connected to the color correction processing circuit;
wherein the light-emission control circuit comprises a programming terminal, and the programming terminal is electrically connected to the color correction processing circuit, and the programming terminal receives the color correction result information, so as to adjust a light-emission control program in the light-emission control circuit; and
wherein the driving circuit is electrically connected to the light-emission control circuit, so as to drive the light source assembly to emit light according to the adjusted light-emission control program.

9. An external flash, comprising:
a light source assembly;
a driving circuit configured to drive the light source assembly to emit light;
a first communication circuit configured to communicate with a terminal device, so as to receive a color correction control instruction sent by the terminal device; and
a color correction processing circuit connected to the driving circuit and electrically connected to the first communication circuit, wherein the color correction processing circuit receives the color correction control instruction transmitted by the first communication circuit, and performs color correction processing on light-emission information of the light source assembly to generate color correction result information; and the driving circuit drives, according to the color correction result information, the light source assembly to emit light;
wherein the driving circuit further comprises a timing reception terminal, and the timing reception terminal is configured to be connected to the terminal device, so as to receive a timing control instruction sent by the terminal device.

10. A color correction system, comprising:
an external flash, a color correction detection device and a terminal device, wherein the external flash is in communication connection with the terminal device, and the color correction detection device is in communication connection with the terminal device;
wherein the external flash comprises:
a light source assembly;
a driving circuit configured to drive the light source assembly to emit light;
a first communication circuit configured to communicate with a terminal device, so as to receive a color correction control instruction sent by the terminal device;
a color correction processing circuit connected to the driving circuit and electrically connected to the first communication circuit, wherein the color correction processing circuit receives the color correction control instruction transmitted by the first communication circuit, and performs color correction processing on light-emission information of the light source assembly to generate color correction result information; and the driving circuit drives, according to the color correction result information, the light source assembly to emit light; and
a timing control circuit, and the timing control circuit is electrically connected to the driving circuit, wherein the timing control circuit is electrically connected to a color correction detection device, wherein the color correction detection device is configured to detect the light-emission information of the light source assembly;
wherein the timing control circuit sends a timing signal to the driving circuit and the color correction control detection device according to the color correction control instruction, so as to enable the light source assembly to emit light at a preset timing and enable the color correction detection device to collect the light-emission information at a preset timing correspondingly;
wherein the color correction detection device is configured to detect light-emission information of the external flash, the color correction processing circuit of the external flash processes the light-emission information under the control of the terminal device.

11. The color correction system according to claim 10, wherein the terminal device comprises a display circuit, and the display circuit is configured to display a color correction control interface for inputting a color correction control instruction.

12. The color correction system according to claim 10, wherein the terminal device is one of a mobile phone, a tablet computer, a notebook computer, or a wearable device.

13. The color correction system according to claim 10, wherein the first communication circuit is further configured to receive light-emission information sent by the terminal device, and wherein the light-emission information is collected by a color correction detection device.

14. The color correction system according to claim 10, wherein the first communication circuit is configured to receive sorting data of light-emission information sent by a terminal device, and wherein the sorting data of the light-emission information is formed by the terminal device sorting and processing light-emission information that is collected by a color correction detection device.

15. The color correction system according to claim 10, wherein the first communication circuit comprises a wireless communication circuit; and
    wherein the wireless communication circuit comprises one or more of a WIFI module, a Bluetooth module, a Zig-Bee module, and an infrared communication module.

16. The color correction system according to claim 10, wherein the external flash further comprises a second communication circuit, and the second communication circuit is configured to be connected to the color correction detection device, and wherein the color correction detection device is configured to detect the light-emission information of the light source assembly; and
    wherein the color correction processing circuit receives the light-emission information through the second communication circuit.

17. The color correction system according to claim 10, wherein the external flash further comprises a storage circuit, and the storage circuit is configured to store the light-emission information.

18. The color correction system according to claim 10, wherein the external flash further comprises a light-emission control circuit, and the light-emission control circuit is electrically connected to the color correction processing circuit;
    wherein the light-emission control circuit comprises a programming terminal, and the programming terminal is electrically connected to the color correction processing circuit, and the programming terminal receives the color correction result information, so as to adjust a light-emission control program in the light-emission control circuit; and
    wherein the driving circuit is electrically connected to the light-emission control circuit, so as to drive the light source assembly to emit light according to the adjusted light-emission control program.

\* \* \* \* \*